United States Patent

[11] 3,580,165

[72] Inventor Ralph M. Foldenauer
Chicago, Ill.
[21] Appl. No. 831,039
[22] Filed June 6, 1969
[45] Patented May 25, 1971
[73] Assignee Bloomer-Fiske, Inc.

[54] MEAT MOLD
3 Claims, 3 Drawing Figs.

[52] U.S. Cl..................................................... 99/351
[51] Int. Cl................................................ A47j 27/20
[50] Field of Search........................................... 99/351,
349, 350; 220/93; 100/(Meat Digest), 54, 57

[56] References Cited
UNITED STATES PATENTS
1,981,889 11/1934 Wolff............................. 99/351
2,037,892 4/1936 Gleason........................ 99/351X
2,192,225 3/1940 Gleason........................ 99/351
2,696,442 12/1954 Allbright............(100/Meat Digest)UX
2,726,024 12/1955 Hawley........................ (99/351)UX
2,729,947 1/1956 Cheney.............(100/Meat Digest)UX FOREIGN PATENTS
416,188 9/1934 Great Britain................ 99/351

Primary Examiner—Walter A. Scheel
Assistant Examiner—Arthur O. Henderson
Attorney—Spector and Alster ABSTRACT: A multiple cavity meat mold, wherein each cavity is open at both ends, has a closure-forming pressure plate for one end of each cavity, each plate being independently biased by a coil spring and provided with a guide pin, coaxial with the coil spring, that fits into a guide sleeve on the spring backing. The plates maintain the ends of the meat in the mold cavities perpendicular to the axis of the associated cavity during the cooking and chilling. The plates are held onto the mold body by a ratchet arrangement. At the bottom of each mold cavity is a removable closure end plate.

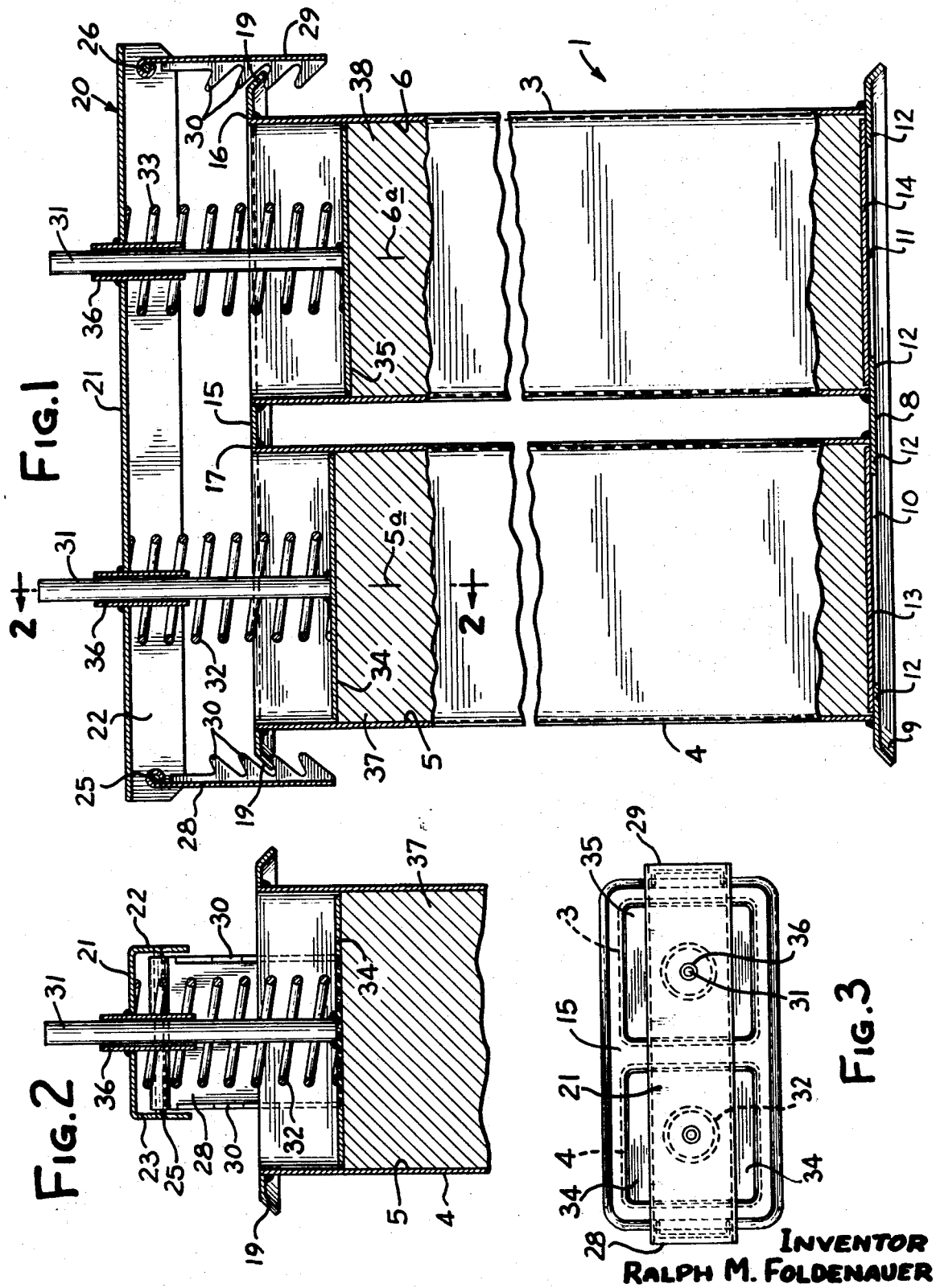

MEAT MOLD

This invention relates to improvements in molds and mold covers that maintain loaves of meat compressed in the molds during cooking and chilling of the loaves of meat.

It is an object of this invention to provide a multiple cavity meat mold in which a cover for the mold has a closure-forming pressure plate movably disposed in the open end of each mold cavity for engagement with the adjacent end of a meat loaf therein, and wherein a spring and guide pin arrangement imposes axial pressure on each plate independently of the pressure imposed on the other plates to maintain independently each plate at right angles to the longitudinal axis of the associated mold cavity and in pressure engagement with the loaf therein as the loaf changes longitudinal dimensions during cooking and chilling. This insures that when the product is withdrawn from the mold, the end adjacent to the cover is at right angles to the longitudinal axis of the loaf so that the end slice of the loaf is substantially uniform with respect to the other slices and thus does not become a waste product.

It is a further object of this invention to provide a mold cover of the type stated in which each of the pressure plates thereof is independently biased into pressure engagement with the meat loaf by a coil spring which is centered on the longitudinal axis of the associated guide pin and mold cavity when the cover and mold are assembled.

It is an additional object of this invention to provide a mold of the type stated that permits easy removal of the cover from the mold and yet reduces the possibility of damage to the cover that may be caused by jamming of the cover plates in the mold cavities so as to prevent misalignment of the cover plate as the cover is withdrawn from the mold.

The attainment of the above and further objects of this invention will be apparent from the following description taken in conjunction with the accompanying drawing forming a part thereof.

In the drawing:

FIG. 1 is a longitudinal sectional view of a mold constructed in accordance with and embodying the present invention;

FIG. 2 is a fragmentary sectional view taken along line 2-2 of FIG. 1; and

FIG. 3 is a top plan view on a reduced scale of FIG. 1.

Referring in more detail to the drawing, 1 designates a mold comprising two identical hollow cylinders 3, 4 forming the wall of cavities 5, 6. The cylinders 3, 4 herein shown are shaped such that the mold cavities are substantially square in transverse cross section, although they may, if desired, have other cross sections, for instance rectangular or circular. Welded to the lower ends of the cylinders 3, 4 is a bottom connector 8 having a marginal flange 9 that is outwardly of and extends around the cylinders 3, 4 and constitutes a footing for the mold 1. The bottom connector 8 has openings 10, 11 which, during the product molding, are closed off by removable end plates 13, 14 which in plan view are of a size and shape approximately that of the cross section of the mold cavities 5, 6 and are at right angles to the longitudinal axes 5a, 6a of the mold cavities 5, 6. The plates 13, 14 rest on stops 12, 12 which are portions of the bottom connector 8 extending radially inwardly from the walls of the mold cavities 5, 6 and which define the openings 10, 11.

The cylinders 3, 4 are also secured at their upper ends by a top connector 15 that is a plate having two holes 16, 17 sized for receiving the upper ends of the cylinders 3, 4 and at which the cylinders are welded. Thus, the top and bottom connectors 8, 15 rigidly secure the cylinders 3, 4 spaced apart to facilitate heating and chilling of the cylinders 3, 4 and with their longitudinal axes 5a, 6a parallel. The top connector 15 also has an outwardly and downwardly inclined flange 19 that surrounds both cylinders 3, 4, for purposes presently more fully appearing.

The mold assembly also comprises a cover 20 having a channel-shaped member that includes rectangular web or spring backing 21 and downwardly turned reinforcing flanges 22, 23. Secured to the opposite ends of the flanges 22, 23 by hinge pins 25, 26 are ratchet arms 28, 29. The lateral margins of the ratchet arms 28, 29 are inwardly turned and shaped to provide uniform ratchet teeth 30 which are adapted to engage the flange 19 to hold the cover 20 removably in place onto the top connector 15.

Welded or otherwise rigidly secured each to one end of the backing 21 are coil compression springs 32, 33, the longitudinal axes of which coincide with the axes 5a, 6a when the cover 20 is mounted onto the top connector 15. The other ends of the springs 32, 33 are welded to pressure plates or covers 34, 35 which are slidably disposed in the open ends of the mold cavities 5, 6 and have a generally square shape that is substantially the same as that of the cross section of the cavities 5, 6. Also welded centrally of the plates 34, 35 and perpendicular thereto are guide pins 31, 31 that are coaxial with the associated springs 32, 33 and are axially slidably mounted in guide sleeves 36, 36, the latter being welded to the backing 21. The sleeves 36, 36 project beyond both sides of the backing 21. When the springs 32, 33 are uncompressed, as when the cover is off of the mold, the pins 31, 31 extend above the sleeves 36, 36 so that at all times the pins 31, 31 occupy the full length of their respective sleeves 36, 36.

The pressure plates 34, 35 are maintained in pressure engagement with the adjacent ends of the loaves 37, 38 in their respective mold cavities by the springs 32, 33. Because of the guide pins 31, 31 and sleeves 36, 36, the plates 34, 35 are at all times kept perpendicular to the longitudinal axes 5a, 6a. The springs 32, 33 also maintain the flange 19 in engagement with the ratchet teeth 30. When the cover 20 is assembled with the cylinders after the product has been stuffed into the mold cavities 5, 6, it is desirable that the springs 32, 33 by substantially deflected so that the pressure plates 34, 35 are in firm engagement with the ends of the meat prior to placing the mold in the cooking chamber. The corresponding ratchet teeth 30 (i.e. first from the top, second from the top, etc.) on the arms 28, 29 will be in engagement with the flange 19 with the result that the backing 21 will be parallel to the pressure plates 34, 35. Moreover, the arms 28, 29 will be parallel to the axes 5a, 6a, irrespective of which of the corresponding teeth 30 on each arm 28, 29 are in engagement with the flange 19.

As a result of the expansion and contraction of each meat loaf in its mold during cooking and subsequent chilling, the loaf is always pressed by the associated pressure plate 34 or 35. Furthermore, each plate 34, 35 will always be maintained at right angles to the longitudinal axis of the associated loaf, regardless of the amounts of expansion and contraction of the other loaf. Consequently, when the loaves 37, 38 are removed from the mold, both of their opposite ends will be perpendicular to the longitudinal axis of the loaf to facilitate slicing of the loaf into uniform pieces after the loaf has passed through the slicing machine.

The plates 34, 35 are prevented by the guide pins 31 and sleeves 36 from twisting relative to the springs 32, 33 should the cover be carelessly removed from the mold in a manner that tends to cause binding of the plates 34, 35 within the mold cavities. As a result, misalignment of the pressure plates 34, 35 is substantially reduced as compared to a cover that does not utilize the guide pins 31, 31 and sleeves 36, 36.

The precise constructions herein shown are illustrative of the principles of the invention. What is considered new and sought to be secured by Letters Patent is:

I claim:

1. A mold having elongated side by side parallel cavities for receiving a food product to be molded into loaves and wherein the loaves are subject to changes in length during the molding operation, the mold cavities being open at one end of the mold, pressure plate covers for the respective open cavities, each cover being disposed in its mold cavity for engagement with the adjacent end of the loaf being molded therein, and the respective plates being movable in their respective mold cavities independently of one another, a backing member for all of the covers, means securing one end of the backing member to the mold adjacent to one of the cavities, means securing an opposite end of the backing member to the mold adjacent to another cavity, separate spring means between the respective pressure plate covers and the backing member for maintaining each cover in pressure engagement with the loaf being molded in its cavity, separate guiding means between the respective pressure plates and the backing member each for preventing tilting of its pressure plate as its pressure plate moves in its mold cavity to maintain its loaf under pressure, said spring means and said guiding means being between the two securing means.

2. A mold according to claim 1, wherein each guiding means comprises a pin one end of which is rigidly secured to its pressure plate and the other end of which is guided in by the backing plate.

3. A mold according to claim 2 wherein each mold cavity is open at its end remote from the pressure plate cover and is provided with a removable plate closing said remote end and removable from the mold cavity by sliding it therethrough.